USO05578357A

United States Patent [19]
Fink

[11] Patent Number: 5,578,357
[45] Date of Patent: Nov. 26, 1996

[54] CARPET AND TECHNIQUES FOR MAKING AND RECYCLING SAME

[75] Inventor: Wilbert E. Fink, Villanova, Pa.

[73] Assignee: Polyloom Corporation of America, Dayton, Tenn.

[21] Appl. No.: 179,321

[22] Filed: Jan. 10, 1994

Related U.S. Application Data

[62] Division of Ser. No. 64,380, May 21, 1993, Pat. No. 5,288,349, which is a division of Ser. No. 833,093, Feb. 10, 1992, Pat. No. 5,240,530.

[51] Int. Cl.$^6$ .............................. B29C 65/18; B32B 3/02
[52] U.S. Cl. .............................. 428/95; 428/85; 428/97
[58] Field of Search .............................. 428/85, 95, 97

[56] References Cited

U.S. PATENT DOCUMENTS

| | | |
|---|---|---|
| Re. 31,826 | 2/1985 | Machell . |
| B 501,415 | 1/1976 | Taft et al. . |
| 3,309,259 | 3/1967 | Schwartz .............................. 428/95 |
| 3,390,035 | 6/1968 | Sands . |
| 3,537,946 | 11/1970 | Traux et al. . |
| 3,551,231 | 12/1970 | Smedberg . |
| 3,562,373 | 2/1971 | Logrippo . |
| 3,583,936 | 6/1971 | Stahl . |
| 3,640,786 | 2/1972 | Carpenter .............................. 156/72 |
| 3,653,803 | 4/1972 | Hammer . |
| 3,676,280 | 7/1972 | Sands . |
| 3,887,737 | 6/1975 | Baxter et al. .............................. 428/95 |
| 3,928,281 | 12/1975 | Uchigaki et al. .............................. 260/42.39 |
| 3,940,525 | 2/1976 | Ballard . |

(List continued on next page.)

FOREIGN PATENT DOCUMENTS

| | | |
|---|---|---|
| 0518014A1 | 12/1992 | European Pat. Off. . |
| 47-28438 | 7/1972 | Japan . |
| 61-119780 | 6/1986 | Japan . |
| 3-030877 | 2/1991 | Japan . |
| 60-109806 | 3/1991 | Japan . |
| 971958 | 10/1964 | United Kingdom . |
| 2067135 | 7/1981 | United Kingdom . |
| WO91/01221 | 2/1991 | WIPO . |

OTHER PUBLICATIONS

A. Addedo and A. Pellegrini, *Mehrschichtiger PP-Belag für Autoböden*, Chemiefasern/ Textilindustrie Man–Made Fibers, vol. 41, No. 10, Oct. 1991, pp. 1235–1236.
(Translation) A. Addedo and A. Pellegrini, *Multilayer Polypropylene Covering for Auto Floors*, pp. 1–5.
Fibertex/Dow, *The TWO–in–One System*, Tifcon Presentation 1994, 20 pages.
Is Carpet Hazardous to Our Health?, Carpet & Rug Industry, Oct. 1990.
Rexene® Polypropylene Resins, El Paso Products Company Rexene® Injection Molding "A"®.
Amorphous Polypropylene, Crowley Chemical Company, New York, NY.
Eastman® Amorphous Polyolefins, Publication GN–386, Oct. 1988.

*Primary Examiner*—Terrel Morris
*Attorney, Agent, or Firm*—Burns, Doane, Swecker & Mathis LLP

[57] ABSTRACT

The disclosure relates to a carpet, a process for manufacturing a carpet and a method for recycling a carpet. The carpet of the present disclosure includes a primary backing having tufts of synthetic carpet fibers protruding from a top surface and, optionally, a secondary backing, with an extruded sheet of an isotactic polyolefin polymer between and integrally fused to a bottom surface of the primary backing and an upper surface of the secondary backing. The process for manufacturing the recyclable carpet includes contacting the extruded sheet with the primary backing and, optionally, the secondary backing, at a temperature sufficiently high to integrally fuse the extruded sheet to the respective backing. The method for recycling synthetic carpet of the type described includes manufacturing the carpet, collecting portions of the carpet, and melting the collected portions to make a feedstock.

27 Claims, 3 Drawing Sheets

U.S. PATENT DOCUMENTS

| | | |
|---|---|---|
| 3,975,224 | 8/1976 | Ruzek et al. . |
| 3,982,051 | 9/1976 | Taft et al. . |
| 4,028,159 | 7/1977 | Norris . |
| 4,035,533 | 7/1977 | Chambley . |
| 4,086,381 | 4/1978 | Cheshire et al. ............... 428/113 |
| 4,140,071 | 2/1979 | Gee et al. ........................ 428/95 |
| 4,158,646 | 6/1979 | Benkowski et al. . |
| 4,234,366 | 11/1980 | Brewer et al. . |
| 4,336,286 | 6/1982 | Tomarin ............................ 428/17 |
| 4,456,665 | 6/1984 | Machell ............................ 428/95 |
| 4,508,771 | 4/1985 | Peoples et al. . |
| 4,522,857 | 6/1985 | Higgins . |
| 4,576,665 | 3/1986 | Machell . |
| 4,624,878 | 11/1986 | Evans et al. ....................... 428/95 |
| 4,663,370 | 5/1987 | Marvel, Sr. et al. . |
| 4,673,604 | 6/1987 | Frain, III et al. .................. 428/95 |
| 4,705,706 | 11/1987 | Avery ............................... 428/17 |
| 4,844,765 | 7/1989 | Reith . |
| 4,875,954 | 10/1989 | Griffths et al. . |
| 5,109,784 | 5/1992 | Lepe-Cisneros . |
| 5,130,069 | 7/1992 | Tietz et al. . |
| 5,240,530 | 8/1993 | Fink ................................. 156/94 |
| 5,256,224 | 10/1993 | Gillyns et al. .................... 428/85 |
| 5,283,097 | 2/1994 | Gillyns et al. .................... 428/95 |
| 5,288,349 | 2/1994 | Fink ................................. 156/72 |
| 5,317,070 | 5/1994 | Brant et al. .................. 526/348.5 |
| 5,370,757 | 12/1994 | Corbin et al. ..................... 156/72 |
| 5,380,574 | 1/1995 | Katoh et al. ...................... 428/92 |

CARPET AND TECHNIQUES FOR MAKING AND RECYCLING SAME

This application is a divisional, of application Ser. No. 08/064,380, filed May 21, 1993, now U.S. Pat. No. 5,288, 349, which is a divisional of application Ser. No. 07/833,093 filed on Feb. 10, 1992, now U.S. Pat. No. 5,240,530.

BACKGROUND

1. Field of the Disclosure

The present invention relates to carpets and methods for making and recycling carpets. More specifically, the carpet may be tufted and possess one or more backing layers.

2. Description of the Prior Art

Tufted carpets are composite structures in which the face fiber forming the pile, i.e., the surface of the carpet, is needled through a primary backing and the base of each tuft extends through the primary backing and is exposed on the bottom surface of the primary backing.

The basic manufacturing approach to the commercial production of tufted carpeting is to start with a woven scrim or primary carpet backing and to feed this into a tufting machine or a loom. The carpet face fiber is needled through and embedded in the primary carpet backing thus forming a tufted base or griege goods.

Griege goods are typically backed with an adhesive coating in order to secure the face fiber to the primary backing. Low cost carpet often receives only a latex adhesive coating as the backing. This type of carpet is widely used in boats and is called marine backed carpet. Typically, the marine backed carpets are backed with a latex adhesive coating that is water and/or mildew resistant. Higher cost carpet often receives both a secondary backing and a latex adhesive coating.

The face fiber or yarn used in forming the pile of a tufted carpet is typically made of any one of a number of types of fiber, e.g., nylon, acrylics, polypropylene, polyethylene, polyamides, polyesters, wool, cotton, rayon and the like.

Primary backings for tufted pile carpets are typically woven or non-woven fabrics made of one or more natural or synthetic fibers or yarns, such as jute, wool, polypropylene, polyethylene, polyamides, polyesters, and rayon. Films of synthetic materials, such as polypropylene, polyethylene and ethylene-propylene copolymers may also be used to form the primary backing.

Likewise, secondary backings for tufted pile carpets are typically woven or non-woven fabrics made of one or more natural or synthetic fibers or yarns. Preferably, secondary backings for tufted pile carpets are open weave or leno weave, i.e., tape yarn in the warp direction and spun staple fiber in the fill direction. The spun staple fiber is more costly but desirable to increase adhesion between the backing and the latex adhesive.

The application of the latex adhesive coating involves preparing griege goods by stitching a primary carpet backing material with face fiber in a manner so as to form on the top surface of the material a pile composed of numerous closely spaced, up-standing loops of yarn. Thereafter, the bottom surface of the thus formed griege goods is coated with a latex polymer binder such as a styrene-butadiene copolymer. The coated griege goods are then passed through an oven to dry the latex adhesive coating to bond the face fibers to the primary backing which causes the bonding of and which is the principal reason for adding the latex binder.

If desired, a secondary backing may be bonded to the undersurface of the primary backing. To produce tufted carpets with a secondary backing, the bottom surface of the griege goods is coated with a latex polymer binder. Then, the secondary backing is applied to the coated bottom surface and the resulting structure is passed through an oven to dry the latex adhesive coating to bond the secondary backing to the griege goods.

The above-described method for making carpet is used in 80 to 90% of all carpet made in the United States. This carpet-making method has disadvantages in that it requires a drying step and thus an oven to dry the latex polymer binder. The drying step increases the cost of the carpet and limits production speed. Furthermore, it has recently been reported that latex adhesive compositions generate gases that may be the cause of headaches, watery eyes, breathing difficulties and nausea, especially when used in tightly sealed buildings. See Herligy, *The Carpet & Rug Industry*, October 1990. In addition, overheating of the carpet may occur during drying of the latex which in turn may affect the shade of the carpet.

Consequently, carpet manufacturers have been attempting to develop a new approach for the preparation of tufted carpets. One new approach is the preparation of tufted carpets with a hot-melt adhesive composition instead of a latex composition.

Hot-melt adhesives are amorphous polymers that soften and flow sufficiently to wet and penetrate the backing surfaces and tuft stitches of carpets upon application of sufficient heat. Furthermore, hot-melt adhesives tend to adhere to the backing surfaces and/or tuft stitches. That is, hot-melt adhesives stick to backing surfaces and tuft stitches.

By the use of hot-melt adhesive, the necessity of drying the composition after application is eliminated and further, when a secondary backing material is desired, it can be applied directly after the hot-melt composition is applied with no necessity for a drying step.

Application of a hot-melt composition is generally accomplished by passing the bottom surface of the griege goods over an applicator roll positioned in a reservoir containing the hot-melt composition in a molten state. A doctor blade is ordinarily employed to control the amount of adhesive which is transferred from the application roll to the bottom surface of the structure. After application of the hot-melt composition to the bottom surface of the griege goods, and prior to cooling, the secondary backing, if desired, is brought into contact with the bottom surface, and the resulting structure is then passed through nip rolls and heated.

The activation temperature of a hot-melt adhesive, i.e., the temperature at which the adhesive softens and flows sufficiently to wet and penetrate the backing surfaces and tuft stitches, is below the temperature at which the backing and face yarns melt or otherwise distort. Otherwise, the backing and face yarns may suffer other damage due to heating.

Hot-melt adhesives also must have low enough viscosities at temperatures employed in finishing to achieve good wetting of the backings and sufficient encapsulation of tuft stitches to make the tuft yarns resistant to pull-out, pilling and fuzzing. In addition, for commercial practice, economics of a carpet manufacturing process utilizing hot-melt adhesive must be at least as good as those of conventional latex lamination techniques which remain the dominant lamination process in commercial carpet manufacture.

A number of hot-melt adhesives and processes using the hot-melt adhesive have been proposed for use in carpet lamination. For example, U.S. Pat. No. 3,551,231, issued Dec. 29, 1970 to Smedberg, discloses a hot-melt adhesive carpet lamination process in which molten adhesive consisting of an ethylene-vinyl acetate copolymer and, optionally, waxes (e.g., microcrystalline and polyethylene waxes), fillers (e.g., calcium carbonate), resin extenders (e.g., dicyclopentadiene alkylation polymers) and antioxidant is applied to a tufted primary backing and then a secondary backing is contacted with the molten adhesive under pressure after which the assembly is cooled to solidify the adhesive.

U.S. Pat. No. 3,583,936, issued Jun. 8, 1971 to Stahl, discloses a hot-melt adhesive for tufted carpet lamination comprising about 10–35 weight percent ethylene copolymer comprising about 60–85 weight percent ethylene, and about 15–40 weight percent lower vinyl ester, acrylate or methacrylate; about 10–25 weight percent wax, such as microcrystalline petroleum, polyolefin, or paraffin wax having a melting point sufficient to give an adhesive composition with a softening point greater than 190° F.; and about 50–70 weight percent resin extender composed of a base resin prepared from reactive olefins and diene monomers of 5–7 carbons.

The hot-melt compositions are selected for their adhesive properties. That is, the hot-melt composition may be selected for their suitability in adhering the tufts of face yarn to the primary backing and to adhere the secondary backing to the primary backing. Such compositions are generally amorphous or substantially non-crystalline due to the adhesive properties of such polymers.

For example, U.S. Pat. No. 3,982,051, issued Sep. 21, 1976 to Taft et al., discloses a carpet containing a hot-melt composition of ethylene copolymer, atactic polypropylene and vulcanized rubber. The atactic, substantially non-crystalline, polypropylene used in the hot-melt composition may be obtained as a by-product from the preparation of substantially Crystalline, isotactic, polypropylene. Atactic polypropylene is particularly suitable as a hot-melt composition due to its adhesive nature whereas isotactic polypropylene is not particularly suitable as a hot-melt composition due to its lack of adhesive properties.

Other patents that disclose various hot-melt compositions used in the manufacture of carpet include U.S. Pat. Nos. 4,875,954; 4,844,765; 4,576,665; 4,522,857; RE 31,826; 3,940,525; B 501,415; 3,676,280; 3,537,946, 3,390,035; and British Patent Publication 971,958.

While the hot-melt compositions and processes heretofore known are considerably simpler than the latex process, the preparation of carpets of non-uniform quality has, at times, been encountered. Specifically, such carpets using hot-melt adhesives cannot, with reproducible consistency, he prepared with high scrim bonds (force required to remove the secondary hacking from the finished carpet), high tuft pull strength (force required to pull one of the tufts out of the carpet), and high fuzz resistance (an indication of the individual carpet yarns to fuzz and form pills). Thus, while such hot-melt compositions are appealing from a standpoint of cost, speed and safety, some difficulties have been encountered in preparing completely satisfactory carpet. See U.S. Pat. No. 3,551,231, issued Dec. 29, 1970 to Smedberg.

Furthermore, neither the latex adhesive based carpet nor the hot-melt adhesive based carpet may be recycled. Thus, large quantities of carpet trimmings and scrap produced during the manufacture of carpet and used carpet are sent to landfills. Consequently, carpet manufacturers spend a substantial sum on landfill costs.

Thus, while conventional carpet and carpet manufacturing processes are known, these carpets and manufacturing processes have inherent problems due to the compositions employed therein. Specifically, the adhesives used to adhere the tufts of face fiber to the primary backing and to adhere the secondary backing to the primary backing include compositions which require lengthy drying times thus slowing down the manufacturing process. In addition, the latex compositions may produce noxious off gases which create health hazards. Likewise, many of the hot-melt compositions conventionally employed in the manufacture of carpet do not result in reproducible consistency regarding scrim bonds, tuft pull strength and fuzz resistance. Finally, and most importantly, the use of conventional latex adhesives and hot-melt adhesives prevent carpet from being recycled.

From the above background, it is quite apparent that there is need in the art for an improved carpet and method for producing carpet as well as a method for recycling carpet.

SUMMARY OF THE DISCLOSURE AND OBJECTS

The present disclosure relates to an improved carpet, method for producing a carpet and method for recycling a carpet that overcomes many of the problems associated with conventional carpet and carpet manufacturing processes.

Specifically, a carpet is disclosed having at least a primary backing, tufts of carpet fibers protruding from a top surface of the primary backing, a secondary backing and an extruded sheet integrally fused to the primary backing and the secondary backing wherein the primary backing, secondary backing and extruded sheet comprise an isotactic polyolefin polymer.

It is an object of the present disclosure to provide a recyclable carpet containing at least a primary backing having tufts of carpet fibers protruding from a top surface of the primary backing and an extruded sheet of an isotactic polypropylene polymer integrally fused to the primary backing.

Also disclosed is a process for manufacturing a recyclable carpet including at least contacting a bottom surface of a primary backing having tufts of carpet fibers protruding from its top surface with an extruded sheet of a thermoplastic polyolefin polymer at a temperature sufficiently high to integrally fuse the extruded sheet to the bottom surface of the primary backing.

Yet another object of the present disclosure is to provide a process for manufacturing a recyclable carpet including laminating a primary backing having tufts of carpet fibers protruding from its top surface with a secondary backing by contacting a bottom surface of the primary backing material and the top surface of the secondary backing with an extruded sheet of a thermoplastic polyolefin polymer at a temperature sufficiently high to integrally fuse both the bottom surface of the primary backing and the top surface of the secondary backing to the extruded sheet.

Still another object of the present disclosure is to provide a method for recycling a carpet including manufacturing a carpet including a primary backing having tufts of carpet fibers protruding from a top surface and an extruded sheet of a thermoplastic polyolefin polymer integrally fused to the primary backing; collecting portions of the carpet made by the manufacturing process selected for recycling; grinding the portions collected; and melting the desirable portions to make a feedstock.

Another object of the present disclosure is to provide a process for recycling a carpet including manufacturing a carpet having a primary backing, tufts of carpet fibers protruding from a top surface of the primary backing, and a secondary backing between and integrally fused to a bottom surface of the primary backing and an upper surface of the secondary backing wherein the fibers, primary backing, extruded sheet and secondary backing are all made from thermoplastic polymers. The process further includes collecting portions of the carpet selected for recycling; grinding the collected portions of the carpet; separating at least one thermoplastic polymer from the ground carpet; melting the polymer and extruding the polymer into a desired shape.

These and other objects and features will be apparent from the detailed descriptive material which follows.

DETAILED DESCRIPTION OF THE PREFERRED EMBODIMENTS

The following is a detailed description of the various preferred embodiments of the carpet, methods for making the carpet and methods for recycling the carpet.

CARPET

A carpet of the present disclosure includes at least a primary backing having tufts of carpet fibers protruding from a top surface of the primary backing and an extruded sheet of a thermoplastic polyolefin polymer integrally fused to the bottom surface of the primary backing. Optionally, the carpet may contain one or more secondary backings the first of which is also fused to the extruded sheet of thermoplastic polyolefin polymer.

Figure 1:
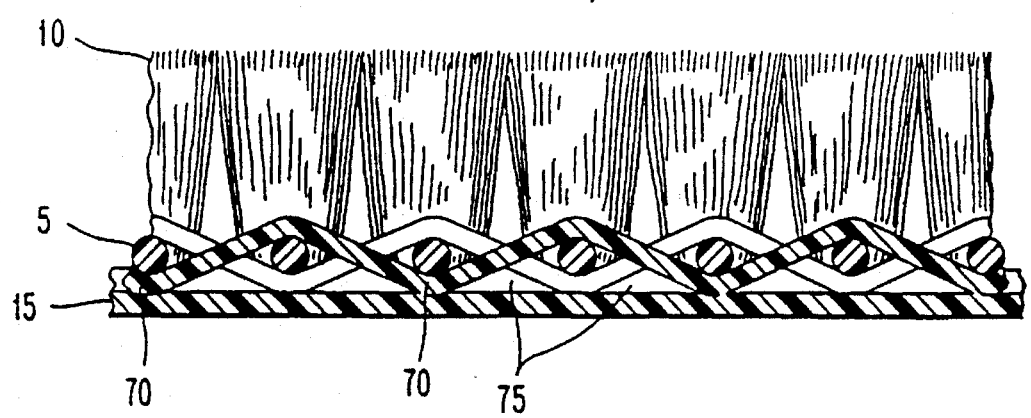
FIG. 1 is a cross-sectional view of one embodiment of the carpet of the present disclosure illustrating a primary backing having tufts of carpet fibers protruding from a top surface and an extruded sheet of a thermoplastic polyolefin polymer integrally fused to a bottom surface of the primary backing.

Referring to FIG. 1, there is shown a carpet of the present disclosure comprising a primary backing 5 made of woven fibers, tufts of carpet face fibers 10 protruding from a top surface of the primary backing 5, and an extruded sheet 15 of a thermoplastic polyolefin polymer integrally fused to the bottom surface of the primary backing 5. The fibers making up the primary backing 5 are actually fused to the extruded sheet 15 as shown at fused portions 70. The fused portions 70 between the bottom surface of the primary backing 5 and the extruded sheet 15 is a result of a heat bond between the primary backing 5 and the extruded sheet 15 during the manufacturing process. Likewise, there may be a mechanical bond between the primary backing 5 and the extruded sheet 15 and between the face fiber 10 and the extruded sheet 15 resulting from the thermoplastic polyolefin polymer flowing between and around the fibers making up the primary backing 5 and the face fibers 10.

While not shown, the tufts of carpet face fibers 10 may also form a heat bond with the extruded sheet 15. Further, the spaces 75 between the primary backing 5 and the extruded sheet 15 may be larger or smaller depending on the penetration of the extruded sheet 15 into the primary backing 5 during manufacture. In fact, the extruded sheet 15 may more or less conform to the shape of the bottom surface of the primary backing 5. Thus, there may be little, if any, space 75 between the extruded sheet 15 and the primary backing 5. Likewise, there may be more or less surface area wherein heat bonding occurs as represented by fused portions 70.

Figure 2:
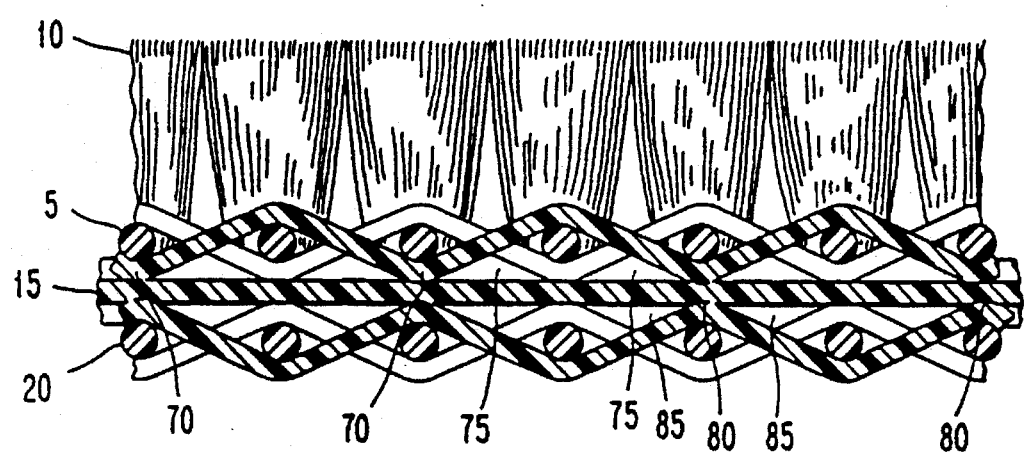
FIG. 2 is a cross-sectional view of another embodiment of the carpet of the present disclosure illustrating a primary backing having tufts of carpet fibers protruding from a top surface, a secondary backing and an extruded sheet of a thermoplastic polyolefin polymer between and integrally fused to both the primary backing and the secondary backing.

Referring to FIG. 2, there is shown a carpet material of the present disclosure comprising a primary backing 5 made of woven fibers, tufts of carpet face fibers 10 protruding from a top surface of the primary backing 5, a secondary backing 20 made of woven fibers and between the primary backing 5 and secondary backing 20, there is shown an extruded sheet 15 of a thermoplastic polyolefin polymer.

As in FIG. 1, the extruded sheet 15 in FIG. 2 is integrally fused to the primary backing 5 as shown at fused portions 70. In addition, the extruded sheet is integrally fused to the face fibers 10 and to the secondary backing 20 as shown at fused portions 80. Thus, there may be both a heat bond and a mechanical bond between the primary backing 5 and the extruded sheet 15, between the face fibers 10 and the extruded sheet 15, and between the secondary backing 20 and the extruded sheet 15.

Also, as in FIG. 1, the tufts of carpet face fibers 10 may also form a heat bond with the extruded sheet 15. Further, the spaces 75 may be larger or smaller depending on the penetration of the extruded sheet 15; into the primary backing 5. Likewise, the spaces 85 may be larger or smaller depending on the penetration of the extruded sheet 15 into the secondary backing 20. Likewise, there may be more or less surface area wherein heat bonding occurs as represented by fused portions 70 and 80.

Figure 3:
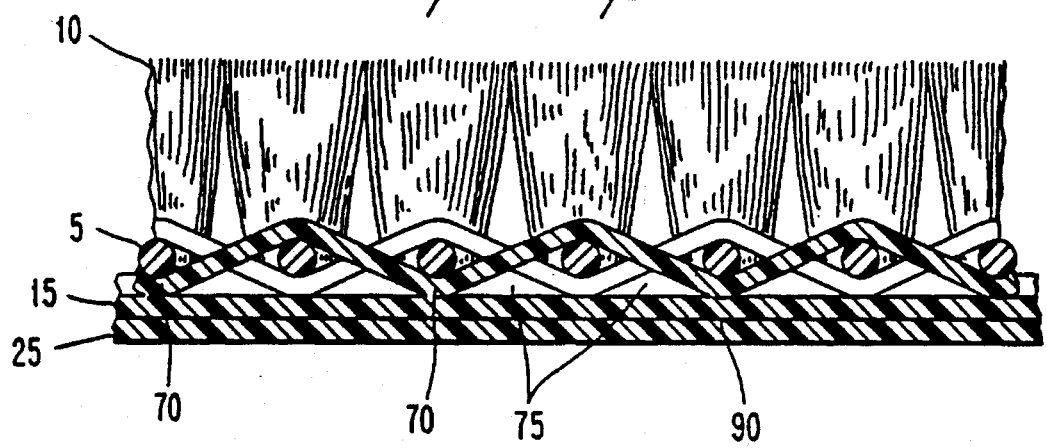
FIG. 3 is a cross-sectional view of another embodiment of the carpet of the present disclosure illustrating a primary backing having tufts of synthetic carpet fibers protruding from a top surface, an extruded sheet of a thermoplastic polyolefin polymer fused to a bottom surface of the primary backing and a coextruded sheet of a thermoplastic polyolefin elastomer fused to a bottom surface of the extruded sheet.

Referring to FIG. 3, there is shown a carpet of the present disclosure comprising a primary backing 5 made of woven fibers, tufts of synthetic carpet face fibers 10 protruding from a top surface of the primary backing 5, and an extruded sheet 15 of a thermoplastic polyolefin polymer integrally fused to the bottom surface of the primary backing 5 as shown at fused portions 70. Additionally, there is shown a coextruded layer 25 of a thermoplastic polyolefin elastomer fused to the bottom surface of the extruded sheet 15 at surface 90.

As in FIGS. 1 and 2, the tufts of carpet face fibers 10 may also form a heat bond with the extruded sheet 15. Further, the spaces 75 may be larger or smaller depending on the penetration of the extruded sheet 15 into the primary backing 5. Likewise, there may be more or less surface area wherein heat bonding occurs as represented by fused portions 70.

Various embodiments of the tufted carpet of the present disclosure are currently contemplated. Each embodiment includes at least a primary backing having tufts of carpet fibers protruding from a top surface of the primary backing and an extruded sheet of a thermoplastic polyolefin polymer integrally fused to the bottom surface of the primary backing.

One preferred embodiment of the carpet of the present disclosure comprises a primary backing having tufts of synthetic carpet fibers protruding from a top surface of the primary backing and an extruded sheet comprising a blend of a thermoplastic polyolefin polymer and a thermoplastic elastomer.

Another preferred embodiment of the carpet of the present disclosure comprises a thermoplastic polyolefin polymer such as an isotactic polypropylene which is integrally fused with the primary backing layer and a coextruded layer containing a blend of thermoplastic polyolefin polymer and thermoplastic elastomer. Blending of the polypropylene with the elastomer provides some of the properties of the elastomer such as flexibility, non-skid character and other properties similar to rubber at a cost lower than that which would be required if the entire extruded or coextruded thermoplastic layer contained the elastomer which is also contemplated.

Another preferred embodiment of the carpet of the present disclosure comprises a thermoplastic polyolefin polymer layer which is integrally fused with the primary backing layer, and optionally, a secondary backing layer which is integrally fused with the thermoplastic polyolefin polymer wherein each of the face fibers, primary backing, thermoplastic polyolefin polymer layer, and secondary layer comprise the same thermoplastic polyolefin polymer. Preferably, the thermoplastic polyolefin polymer is an isotactic polypropylene polymer.

Another preferred embodiment of the carpet of the present disclosure comprises a thermoplastic polyolefin polymer layer which is integrally fused with the primary backing layer, and optionally, a secondary backing layer which is integrally fused with the thermoplastic polyolefin polymer wherein each of the primary backing, thermoplastic polyolefin polymer layer, and secondary layer comprise the same thermoplastic polyolefin polymer and wherein the face fibers comprise a different polymer. Most preferably, the thermoplastic polyolefin polymer is an isotactic polypropylene polymer and the face fibers are nylon or polyester.

Another preferred embodiment of the carpet of the present disclosure comprises an extruded thermoplastic polyolefin polymer sheet which is integrally fused with the primary backing layer, with a secondary backing layer which is integrally fused to the thermoplastic polyolefin polymer sheet, having a delamination strength of at least 2.0 lb./inch of width, preferably at least 2.5 lb./inch of width, even more preferably at least 4.0 lb./inch and even more preferably at least 6.0 lb./inch.

In each of the above embodiments, the extruded layer may form a heat bond and fuse to at least portions of the primary backing, secondary backing, or face fiber. In such a case, the surface of at least one of the layers will melt, even very slightly, and flow together with the extruded material. In addition, the extruded sheet may provide a mechanical bond by penetration of the extruded layer into the primary backing, tufts of face fiber and/or secondary backing.

Other embodiments of the carpet of the present invention may include a third backing applied to the underside of the secondary backing. Such third backing could contain a blend of a polyolefin polymer and a thermoplastic elastomer such that it provides the desired characteristics such as non-slip on the undersurface of the carpet.

TUFTS

The tufts of fiber protruding from the top surface of the primary backing layer may be of any of the conventionally used fibers or yarns for tufting carpet. Such materials preferably include nylon, polyester and polypropylene; however, such materials could include any of the natural or synthetic fibers known by those skilled in the art. Most preferably, the fibers are made of a synthetic resin material such as nylon, polyester or polypropylene. Even more preferably, the fibers protruding from the primary backing are made of the same material as the primary backing itself.

PRIMARY BACKING

The primary backing may include any synthetic resin that will integrally fuse with the extruded sheet and may be, for example, a woven or non-woven fabric, a film or a web. Preferably, the primary backing is made of a thermoplastic polyolefin polymer, copolymer of terpolymer. More preferably, the primary backing is made of an isotactic thermoplastic polyolefin polymer. Most preferably, the primary backing is made of an isotactic polypropylene polymer.

SECONDARY BACKING

In addition, the secondary backing material, if applied, may include any synthetic resin that will integrally fuse with the extruded sheet. Preferably, the secondary backing comprises the same thermoplastic polyolefin polymer, copolymer or terpolymer as the primary backing. Optionally, the secondary backing for the carpets of the present disclosure is a woven or non-woven fabric. Likewise, the secondary backing may be an open weave or leno weave, i.e., tape yarn in the warp direction and spun staple fiber in the fill direction. However, the open weave is not necessary to obtain a suitable bond as required with use of a latex adhesive. Thus, the cost of the carpets of the present disclosure may be reduced by using a less costly secondary backing.

EXTRUDED SHEET

The extruded sheet of thermoplastic polyolefin polymer is obtained by feeding a stock material to an extruder and extruding the stock material at relatively high temperatures to form a thin sheet through a dye at a temperature sufficiently high to integrally fuse the extruded sheet to the primary backing, face fiber, secondary backing or any combination of the primary backing, face fiber or secondary backing. In order to obtain the desired fusion, it is preferred to use a substantially crystalline or isotactic, thermoplastic polyolefin polymer, copolymer or terpolymer. A preferred thermoplastic polyolefin polymer is isotactic polypropylene homopolymer.

The polypropylene homopolymer may be polymerized from propylene using various types of transition metal/organometallic catalyst systems. With proper formulation of the catalyst system, a high degree of stereoselectivity may be obtained causing the propylene to polymerize to an ordered isotactic configuration in which a large proportion of the methyl appendages branching from the polymer backbone are aligned in the same direction. The polymer may be a commercial isotactic polypropylene which is polymerized to a 90 to 95% isotactic content, with the remaining polymer being in the randomly ordered atactic configuration. The degree of isotacticity can be further enhanced by post-reaction solvent extraction of the atactic polypropylene.

Both commercial and purified grades of isotactic polypropylene are suitable for use in the extruded sheet of the present invention.

Isotactic polypropylene is suitable for use in the extruded layer since it has a relatively specific melting point (about 330° F.) and a relatively specific recrystallization point (about 300° F.). Atactic or amorphous polypropylene has no specific melting or recrystallization point. Thus, amorphous polypropylene is difficult to integrally fuse to either the primary backing, face fibers, or secondary backing. Furthermore, the tensile strength of the isotactic polypropylene is approximately 28 to 40 times stronger than the tensile strength of the atactic polypropylene. Thus, the extruded sheet does not require the presence of atactic polyolefin to provide the requisite bond strength between the primary backing, tufts of face fiber or secondary backing. In addition, due to the tensile strength of the isotactic polyolefin, carpets with increased delamination strength may be made.

In addition to homopolymer, other classes of polypropylene are commercially available and may be suitable for use in the extruded sheet. These include polypropylene random copolymers, impact or block copolymers, and terpolymers.

The isotactic polypropylene or other crystalline olefin used in the extruded layer may be compounded with inert fillers by either extrusion compounding or intensive mixing operations. Such fillers may include calcium carbonate, silicates, talc, calcium, glass fibers, carbon black and woodflour. Other fillers may be suitable.

The use of such fillers in the extrusion layer may range from about 0.1% to as high as about 50%. At the high levels, an exceedingly stiff board like material may be made that may be used, e.g., as a trunk liner, molded floor mat or a door panel in an automobile. Since addition of a filler significantly alters the performance and processibility of the polymer, filled systems may be designed to satisfy a particular product need with minimum effect on other performance aspects.

Optionally, blends of polyolefins and thermoplastic elastomers may be used to make the extruded sheet or coextruded layer. The thermoplastic elastomers (TPE's) are a diverse family of rubber-like materials that, unlike vulcanized rubbers, may be processed and recycled as thermoplastics. However, the TPE's are not merely substitutes for thermosetting polymers, they may also replace or improve their properties when blended with them. There are four general groups of TPE's that may be suitable for use in the present invention. The four general groups include polyurethanes, copolyesters, styrenic block copolymers, and polyolefins. Blending the elastomer with the polyolefin polymer provides some of the properties of the elastomer at a lower cost. The compatibility is good for blends ranging from about 10 to about 97% elastomer based on the total amount of thermoplastic polymer and elastomer.

As a class, the TPE's may provide toughness, flexibility over a wide temperature range, and resistance to abrasion, weathering, and a variety of solvents and other chemicals. Thus, the properties of each of the materials in the group may be tailored for use in the carpet of the present invention by polymerization methods, blending, and incorporation of additives, fillers, and reinforcements to form carpets having enhanced abrasion, weathering and chemical resistance.

Table A provides a list of compositions that may or may not be suitable for use in the extruded sheet. The first column provides a list of the possible materials. The second column provides a list of the expected bonding strength with polypropylene. The third column provides a raw material cost index in which polypropylene homopolymer is 1.0. The fourth column lists the expected bonding strength with polypropylene when the material is blended with polypropylene homopolymer. Of course, the expected bonding strength depends on the proper proportions of the listed polymers which may be determined by those skilled in the art with the teachings of the present disclosure. The last column lists the anticipated compatibility in recycling when blended into polypropylene homopolymer.

TABLE A

MATERIALS FOR USE IN THE EXTRUDED SHEET

| MATERIALS | BOND STRENGTH @ 100% | COST (P/P* 1.0) | **BOND STRENGTH BLENDED WITH P/P | COMPATIBILITY IN RECYCLING |
| --- | --- | --- | --- | --- |
| I. POLYPROPYLENE | | | | |
| A. Homopolymer | Excellent | 1.0 | Excellent | Excellent |
| B. Random Copolymers | Excellent | 1.2 | Excellent | Excellent |
| C. Block Copolymers | Excellent | 1.2 | Excellent | Excellent |
| II. POLYETHYLENE | | | | |
| A. Low Density | Poor | 1.0 | Good to Excellent | Good to Excellent |
| B. Linear Low Density | Poor | 1.0 | Good to Excellent | Good to Excellent |
| C. Medium Density | Poor | 1.0 | Good to Excellent | Good to Excellent |
| D. High Density | Poor | 1.0 | Good to Excellent | Good to Excellent |
| E. Polyethylene Copolymers (Comonomers) | | | | |
| 1. Acrylic Acid | Poor | 1.0 | Good to Excellent | Good to Excellent |
| 2. Methacrylic Acid | Poor | 1.0 | Good to Excellent | Good to Excellent |
| 3. Ethyl Acrylate | Poor | 1.0 | Good to Excellent | Good to Excellent |
| 4. Vinyl Acetate | Fair | 1.0 | Good to Excellent | Good to Excellent |
| 5. High Vinyl Acetate Content > 50% | Good | 1.5 | Good to Excellent | Good to Excellent |
| 6. Vinyl Alcohol | Poor | 1.2 | Good to Excellent | Good to Excellent |
| F. Polyethylene Ionomer | Good to Excellent | 2.5 | Good to Excellent | Good to Excellent |

TABLE A-continued

MATERIALS FOR USE IN THE EXTRUDED SHEET

| MATERIALS | BOND STRENGTH @ 100% | COST (P/P* 1.0) | **BOND STRENGTH BLENDED WITH P/P | COMPATIBILITY IN RECYCLING |
|---|---|---|---|---|
| III. POLYBUTYLENE | | | | |
| A. Polybutene 1 | Good | 1.8 | Excellent | Excellent |
| B. Poly(1 Butene/Ethylene) Copolymers | Good | 1.8 | Excellent | Excellent |
| IV. ELASTOMERIC ALLOY TPE's | | | | |
| A. Thermoplastic Vulcanizate (EDPM or NBR) | Fair to Good | 3.0 | Good to Excellent | Good to Excellent |
| B. Melt Processable Rubbers (e.g., Plasticized Chlorinated-Polyolefin-EVA-Acrylate Blend) | Fair to Good | 3.0 | Good to Excellent | Good to Excellent |
| C. Olefinic TPE's | | | | |
| 1. Reactor Produced | Excellent | 2.5 | Excellent | Excellent |
| 2. EDPM or EPR Propylene Blends | Good to Excellent | 2.5 | Excellent | Excellent |
| D. Styrenic TPE's | | | | |
| Styrenic Block Copolymers with Elastomeric Mid Segments, e.g., | | | | |
| 1. Polybutadiene | Good to Excellent | 3.0 | Excellent | Excellent |
| 2. Polyisoprene | Good to Excellent | 4.0 | Excellent | Excellent |
| 3. Ethylene-Butylene | Good to Excellent | 3.0 | Excellent | Excellent |
| 4. Ethylene Propylene Rubber | Good to Excellent | 2.5 | Excellent | Excellent |
| E. Polyurethane Elastomers | | | | |
| 1. Esters | Good | 4.0 | Excellent | Excellent |
| 2. Ethers | Good | 4.0 | Excellent | Excellent |
| 3. Blends with Polyolefins | Good to Excellent | 3.0 | Excellent | Excellent |

*Polypropylene homopolymer.
**Blending Range provided in second column of Table C.

The thickness of the extruded layer will depend on several factors including the particular thermoplastic polyolefins polymer used, the primary backing, the face fiber and the secondary backing and the temperature of the extrudate. For most purposes, an extruded layer of from about 0.5 to about 20 mils is satisfactory. Preferably, the extruded layer is from about 1 to about 15 mils. In instances where the carpet is made without a secondary backing layer, the extruded thermoplastic layer may serve the dual purpose of binding the tufts to the primary backing and providing a durable undersurface. In such cases, it may be desirable to use a thicker extruded layer than would otherwise be necessary. For example, a carpet of the present disclosure containing a secondary backing may include an extruded thermoplastic sheet having a thickness of 1 to 7 mils whereas a tufted carpet of the present disclosure not containing a secondary backing may include an extruded sheet having a thickness of 8 to 15 mils.

MANUFACTURE OF CARPETS

The carpet of the present disclosure is prepared by feeding a primary carpet backing into a conventional tufting machine. During the tufting process, carpet face yarn is also fed into the tufting machine wherein hundreds of individual tufting needles may be employed to stitch through the primary carpet backing thus forming a continuous web of face fiber tufted through the primary backing. At this point, the carpet face fiber is secured to the backing to a degree sufficient for movement of the tufted material for further processing, but not sufficient for its use as a finished carpet. The tufted goods removed from the tufting machine are called griege goods.

The griege goods taken from the tufting machine are finished to make the material suitable for finished carpet. This is accomplished by applying the extruded sheet comprising an isotactic polyolefin polymer to the underside of the griege goods at a temperature sufficiently high as to create a heat bond between the primary backing layer, secondary backing layer and/or carpet face fiber and the extruded sheet. A temperature sufficiently high to create a heat bond is a temperature at least equal to the melting temperature of the polymer. More preferably, a temperature sufficiently high to create a bond is a temperature at least about 100° F. higher than the melting point of the polymer, even more preferably at least about 125° F. higher than the melting point of the polymer, and even more preferably at least about 150° F. higher than the melting point of the polymer. For example, for isotactic polypropylene, a preferred temperature is at least about 450° F., more preferably at least about 475° F., even more preferably at least about 500° F. Of course, temperatures too high may result in unwanted degradation of the polymers.

Figure 4:
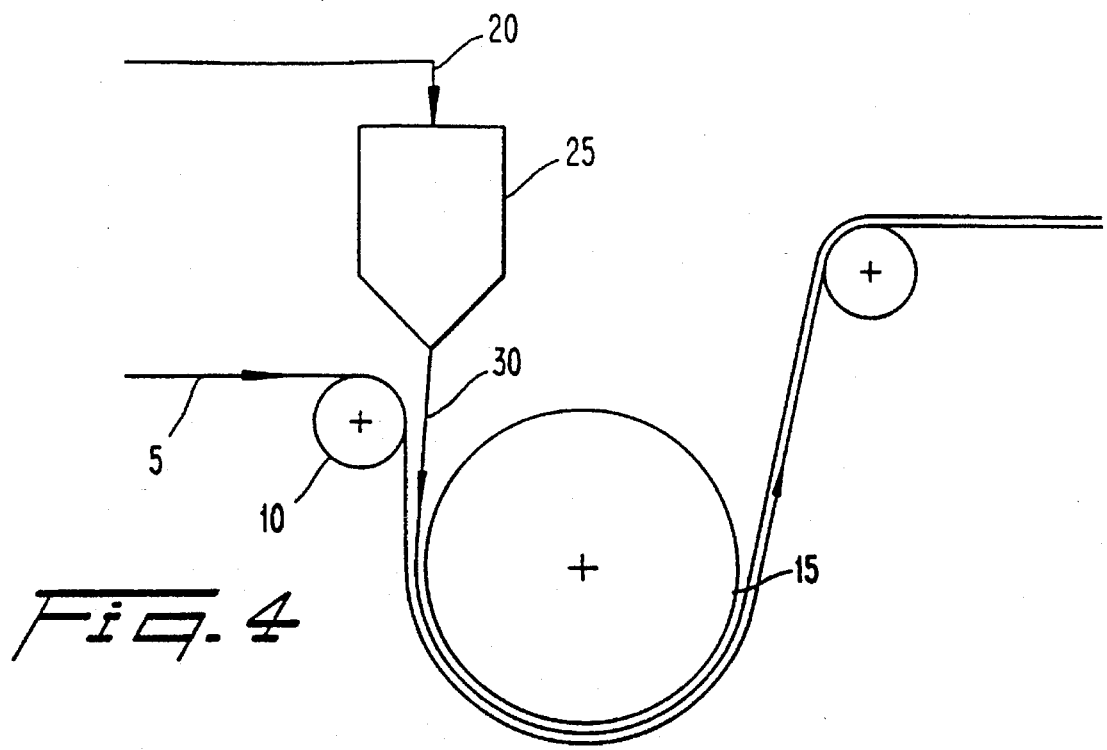
FIG. 4 is a side view of an apparatus used in the making of the carpet illustrated in FIG. 1.

As shown in FIG. 4, a carpet of the present disclosure comprising a primary backing having tufts of synthetic carpet fibers protruding from a top surface of the primary backing and an extruded sheet comprising a thermoplastic polyolefin polymer integrally fused to the primary backing may be prepared by introducing the griege goods 5 with face fibers facing downward between a nip roll 10 and a casting roll 15 and simultaneously forcing an extrudate 20 through a die 25 to form an extruded sheet 30. The extruded sheet 30 is introduced between the casting roll 15 and the griege goods 5 at a point near the nip roll 10 which acts to urge the griege goods 5 together with the extruded sheet 30.

Figure 5:
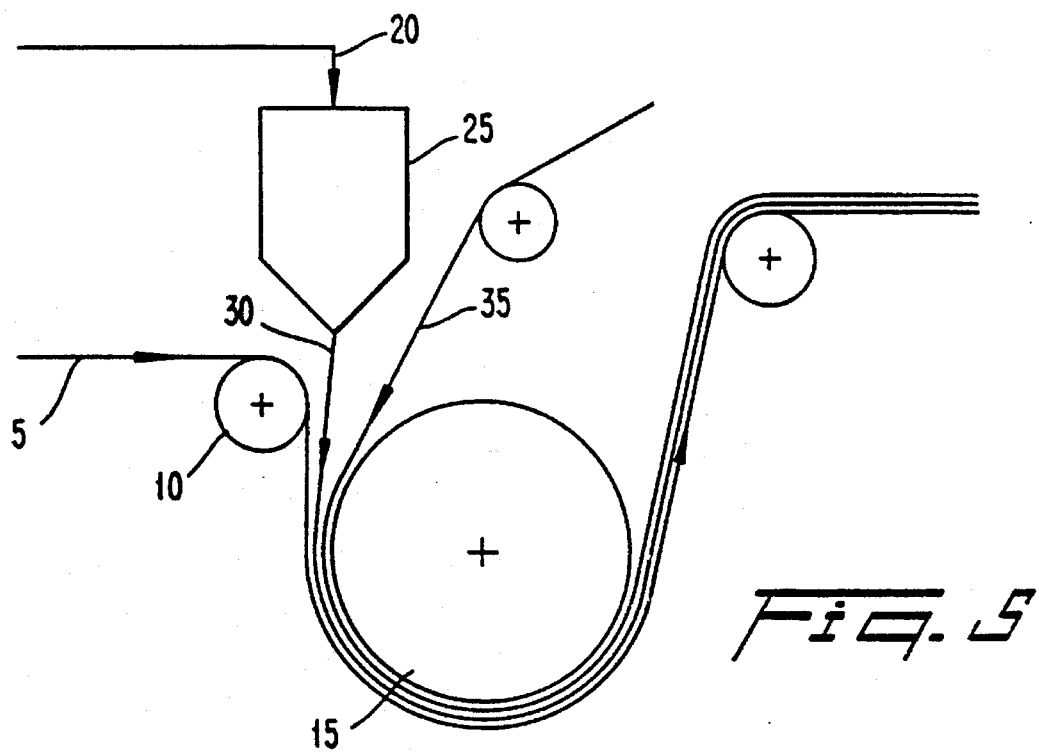
FIG. 5 is a side view of an apparatus used in the making of the carpet illustrated in FIG. 2.

As shown in FIG. 5, a carpet of the present disclosure comprising a primary backing having tufts of synthetic carpet fibers protruding from a top surface of the primary backing, a secondary backing and an extruded sheet comprising a thermoplastic polyolefin polymer between and integrally fused to both the primary backing and the secondary backing may be prepared by introducing the griege goods 5 with face fibers facing downward between a nip roll 10 and a casting roll 15 and simultaneously forcing an extrudate 20 through a die 25 to form an extruded sheet 30. The extruded sheet 30 is introduced between the secondary backing 35 and the griege goods 5 at a point near the nip roll 10 which acts to urge the griege goods together with the extruded sheet 30 and the secondary backing 35 against the casting roll 15.

Figure 6:
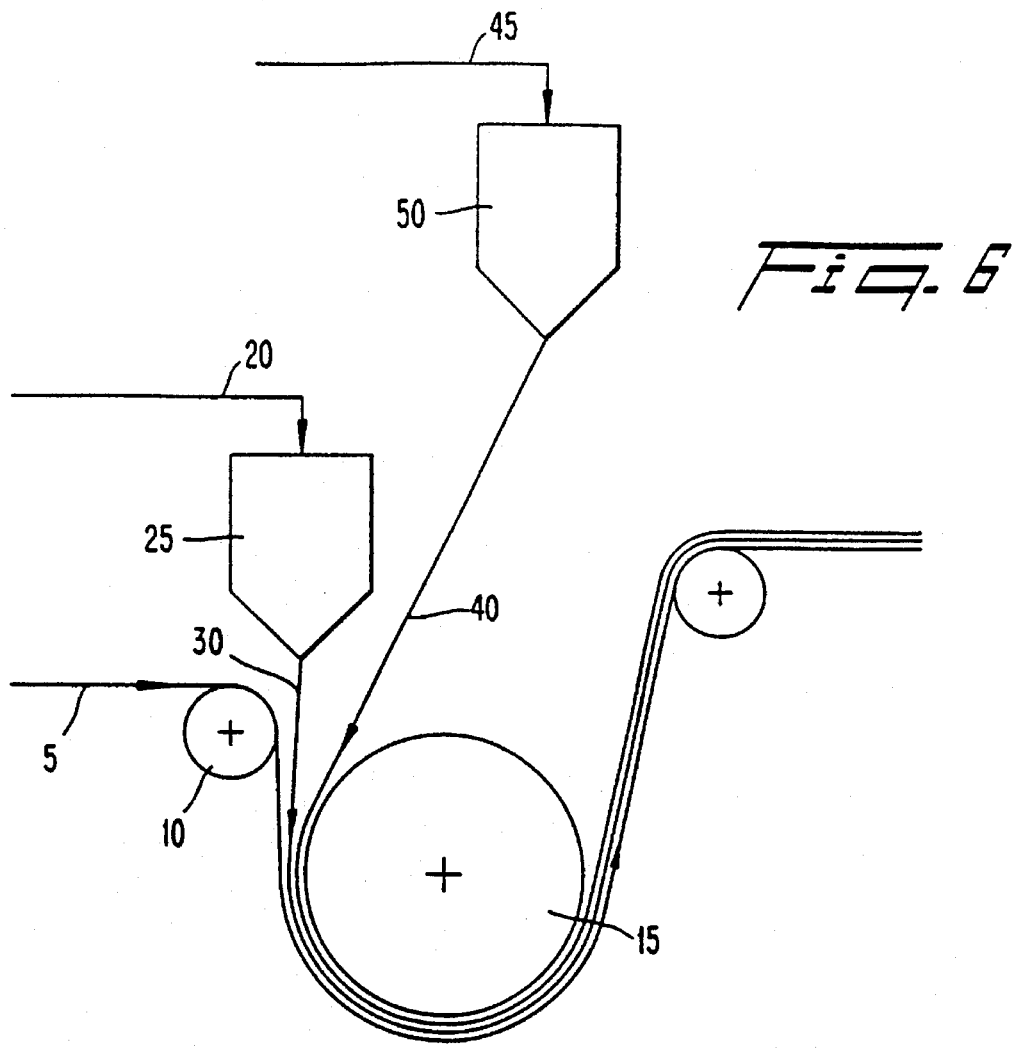
FIG. 6 is a side view of an apparatus used in the making of the carpet illustrated in FIG. 3.

As shown in FIG. 6, a carpet of the present disclosure comprising a primary backing having tufts of synthetic carpet fibers protruding from a top surface of the primary backing, an extruded sheet of a thermoplastic polyolefin polymer integrally fused to the bottom surface of the primary backing, and a coextruded layer of a thermoplastic polyolefin elastomer fused to the bottom surface of the extruded sheet may be prepared by introducing the griege goods 5 with face fibers facing downward between a nip roll 10 and a casting roll 15 and simultaneously forcing an extrudate 20 through a die 25 to form an extruded sheet 30. The extruded sheet 30 is introduced between the coextruded layer 40, which is also prepared by forcing an extrudate 45 through a die 50, and the griege goods 5 at a point near the nip roll 10 which acts to urge the griege goods 5 together with the extruded sheet 30 and the coextruded layer 40 against the casting roll 15.

Figure 6A:
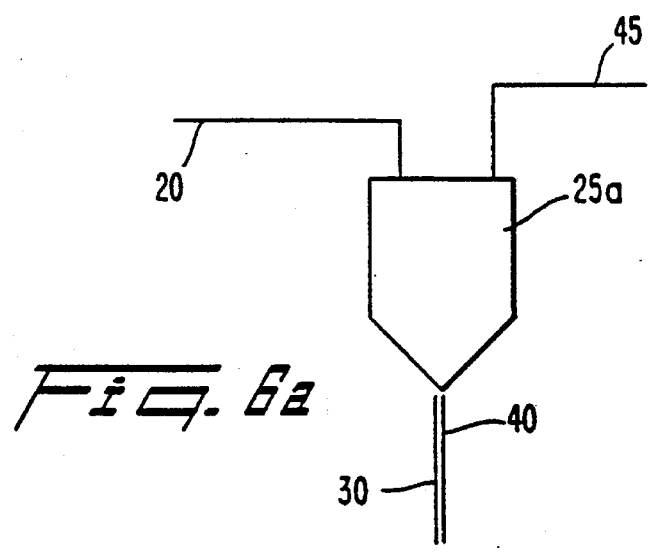

Alternatively, a carpet containing an extruded sheet of a thermoplastic polyolefin polymer and a coextruded layer of a thermoplastic polyolefin elastomer fused to the bottom surface of the extruded sheet may be prepared, as shown in FIG. 6a, by simultaneously forcing extrudate 20 and extrudate 45 through a single die 25a designed to combine extrudate 20 with extrudate 45 such that a laminate containing extruded sheet 30 and coextruded layer 40 is obtained.

The extruded polymer may be contained in an extruder of any conventional or desired construction adapted to force the molten polymer through the die at the desired speed. In this regard, extrusion trials have been conducted using polypropylene homopolymer (prime virgin 5 mils), polypropylene copolymer (recycled from shrink film), polypropylene homopolymer (recycled from fiber), and thermoplastic elastomer polypropylene blend (50/50 blend). In all the trials, the extruded sheet exhibited good bonding strength to the back of the carpet. The griege goods used in the trials included a polypropylene primary backing with polypropylene face fiber and a polypropylene primary backing with nylon face fiber. In addition, certain carpet trials included a secondary backing of woven polypropylene. The secondary backing was found to exhibit good adhesion with all the polymer types listed.

The extrusion trials were conducted with a 1.5 inch diameter, 24:1 (barrel length to diameter ratio), Sterling extruder. The extruder has a 20 horsepower DC drive and a single stage screw. The extruder is equipped with three heating zones, a screen pack collar and a pressure gauge. Speed is controlled by a variable resistor dial and a tachometer is connected to an RPM dial for speed indication. Table B below sets forth the ranges of extrusion conditions used during the extrusion trials.

TABLE B

RANGE OF EXTRUSION CONDITIONS DURING EXTRUSION TRIALS

| | Range (Units) |
|---|---|
| Zone 1 Temp. | 340–440 (°F.) |
| Zone 2 Temp. | 360–480 (°F.) |
| Zone 3 Temp. | 380–550 (°F.) |
| GATE ADAPTER TEMP. | 400–580 (°F.) |
| DIE MELT TEMP. | 450–580 (°F.) |
| PRESSURE | 1000–3000 (psi) |
| SCREW SPEED | 50–100 (rpm) |
| VARIABLE RESISTOR SETTING | 25–50% |
| LINE SPEED | 3–50 (ft./min.) |

The extrusion dye used in the above described trials is a single-flow dye without a choker bar, and having a flex lip design with mechanical adjustment. There are two heating zones which are separately controlled via a dual element thermocouple. The die width is 12 inches. The molten polymer from the dye is deposited on a water cooled casting roll (7.9 inch diameter, 13 inch width). Water passes through helical passages within the casting roll at high velocity to cool the casting roll as required. The pull roll and its nip roll are of 3 inch diameter. There is a fixed draw ratio between the casting roll and the pull roll of 1.005. The entire assembly is driven by eddy current clutch and a 1.5 horsepower motor.

While speeds of 3 to 50 feet per minute were actually used, it is contemplated that higher speeds may be used. In particular, since there is no drying step, speeds of 100 to 300 feet per minute are possible. These speeds require appropriate material handling capability to move large rolls in and out of the process quickly. Thus, in contrast to conventional processes, the limiting factor is the material handling and not the drying step. In addition, die widths of up to 12 feet and greater may be used to produce wider carpets.

Three samples of carpet prepared according to the methods of the present disclosure were tested to determine their delamination strength. A description of the samples is provided below in Examples 1–3 along with a report of their respective delamination strengths. The delamination strength was determined as directed in ASTM Test Method D 3936. A CRE Instron™ tensile tester was used.

EXAMPLE 1

A sample of carpet of the present disclosure including a polypropylene primary carpet backing and having a polypropylene secondary backing was prepared according to the methods of the present disclosure. The primary backing was extrusion laminated with a three mil thick layer of recycled polypropylene homopolymer. The temperature of the extruded sheet was 470° F. as measured at the time of extrusion. Five specimens were taken from each carpet sample and tested. The numerical average delamination strength value reported for the five specimens tested was 1.0 lb./inch of width. The highest delamination strength value reported was 1.2 lb./inch of width. The lowest delamination strength value reported was 0.83 lb./inch of width.

EXAMPLE 2

A sample of carpet of the present disclosure including a polypropylene grass fiber tufted through a polypropylene primary carpet backing and having a polypropylene secondary backing was prepared according to the methods of the present disclosure. The primary backing was extrusion laminated with a five mil thick layer of recycled polypropylene homopolymer. The temperature of the extruded sheet was 500° F. as measured at the time of extrusion. Five specimens were taken from each carpet sample and tested. The numerical average delamination strength value reported for the five specimens tested was 3.0 lb./inch of width. The highest delamination strength value reported was 4.02 lb./inch of width. The lowest delamination strength value reported was 2.28 lb./inch of width.

EXAMPLE 3

A sample of carpet of the present disclosure including a polypropylene grass fiber tufted through a polypropylene primary carpet backing and having a polypropylene secondary backing was prepared according to the methods of the present disclosure. The primary backing was extrusion laminated with a seven mil thick layer of recycled polypropylene homopolymer. The temperature of the extrusion coating was 500° F. as measured at the time of extrusion. Five specimens were taken from each carpet sample and tested. The numerical average delamination strength value reported for the five specimens tested was 4.6 lb./inch of width. The highest delamination strength value reported was 6.96 lb./inch of width. The lowest delamination strength value reported was 3.35 lb./inch of width.

CARPET RECYCLING

Another aspect of the present disclosure is to provide a method for recycling a carpet. The method includes collecting portions of the carpet of the present disclosure selected for recycling, grinding the selected portions and melting the selected ground portions to make a feedstock. Selected portions may include "unusable portions", i.e., those portions which are commonly discarded such as trimmings and fouled process waste, or "used portions", i.e., those portions which have been installed and sufficiently worn.

The recycling process begins with collecting the portions of the carpet compositions of the present disclosure. In the case of a carpet composition wherein the face fiber, primary backing, extrusion layer and secondary backing are made of the same material, the carpet may be directly ground and conveniently fed to an extruder for melt processing. For example, it is possible to make a carpet composition containing a polypropylene face fiber, polypropylene primary backing, polypropylene extruded layer and if desired, polypropylene secondary backing, collect portions of the polypropylene carpet, and grind and melt the collected carpet to produce a feedstock to produce other articles of manufacture. In fact, the feedstock may be melted and used to produce face fiber, primary backings, extruded sheets or secondary backings. Optionally, the feedstock may be used for injection molding.

Carpets of the present disclosure containing different materials may also be recycled. For example, a carpet that has a face fiber other than polypropylene and a polypropylene back, polypropylene extruded sheet and polypropylene secondary back may be recycled. The technique used to recycle such carpet composition includes grinding the carpet down to basic fiber with a fiber length of less than one-quarter inch and perhaps less than one-sixteenth of an inch. This will be necessary to break the mechanical bonding of the face fiber from the polypropylene primary backing and polypropylene extruded sheet. Once the mechanical bond is broken, the fibers may be separated in a washing step.

The washing step includes separation of the various fibers by use of the difference in specific gravity of the materials. Specifically, the ground carpet fibers are introduced into an aqueous bath and allowed to separate. For example, polypropylene having a specific gravity of 0.90 will separate in water from nylon having a specific gravity of 1.1 and polyester having a specific gravity of 1.3. Likewise, the washing step may be useful to remove dirt contamination built up in the carpeting over its use.

Table C summarizes the recycling procedure for various carpet constructions of the present invention.

TABLE C

| | | PROCEDURE FOR RECYCLING VARIOUS CARPET COMPOSITIONS | | | |
|---|---|---|---|---|---|
| SOURCE | FACE YARD | PRIMARY BACK | EXTRUDED SHEET | SECONDARY BACK | DIRECT EXTRUSION |
| 1. Mill Scrap | Polypropylene | Polypropylene | Polypropylene | Polypropylene | Yes |
| 2. Mill Scrap | Nylon | Polypropylene | Polypropylene | Polypropylene | No* |
| 3. Mill Scrap | Polyester | Polypropylene | Polypropylene | Polypropylene | No* |
| 4. Used Carpet | Polypropylene | Polypropylene | Polypropylene | Polypropylene | No* |
| | Nylon | Polypropylene | Polypropylene | Polypropylene | No* |
| | Polyester | Polypropylene | Polypropylene | Polypropylene | No* |

*2. Although this is clean, a separation step is required to isolate the Nylon from the Polypropylene. Once separated, both are valuable materials for re-extrusion.
*3. Exactly the same situation as 2.
*4. The grinding and washing are required to clean and separate the nylon and polyester from the Polypropylene. The washed Polypropylene would be immediately ready to re-extrude. The nylon and polyester if kept separate would also be ready for re-extrusion.

Table D provides a summary of the compatibility for recycling the materials listed in Table A. The potential materials are restated in column 1. The acceptable blend levels with polypropylene homopolymer are stated in column 2. The third, fourth, fifth and sixth columns list the possibility of recycling the polymer or polymer blend to form a fiber, fusion layer, or thin wall or thick wall injection molding, respectively. The last column considers the relative value of the material using prime polypropylene homopolymer which is set at 1.0. Each material is given two values. The first value is the value if used in a fiber or the fusion layer. The second value is the value if the material is used in injection molded parts.

TABLE D

COMPATIBILITY FOR RECYCLING MATERIALS FROM THE FUSION LAYER

| MATERIALS | BLEND RANGE WITH P/P* | POTENTIAL TO FORM A FIBER | POTENTIAL FOR FUSION LAYER | INJECTION THIN WALL | MOLDING THICK WALL | RELATIVE VALUE |
|---|---|---|---|---|---|---|
| I. POLYPROPYLENE | | | | | | |
| A. Homopolymer | 0 to 100% | Excellent | Excellent | Good | Excellent | 0.8–0.5 |
| B. Random Copolymers | 0 to 100% | Good | Excellent | Good | Excellent | 0.7–0.4 |
| C. Block Copolymers | 0 to 100% | Good | Excellent | Good | Excellent | 0.7–0.4 |
| II. POLYETHYLENE | | | | | | |
| A. Low Density | 0 to 50% | Poor | Poor | Good | Excellent | 0.0–0.5 |
| B. Linear Low Density | 0 to 50% | Poor | Poor | Good | Excellent | 0.0–0.5 |
| C. Medium Density | 0 to 50% | Poor | Poor | Good | Excellent | 0.0–0.5 |
| D. High Density | 0 to 50% | Poor | Poor | Good | Excellent | 0.0–0.4 |
| E. Polyethylene Copolymers (Comonomers) | | | | | | |
| 1. Acrylic Acid | 0 to 50% | Poor | Poor | Good | Excellent | 0.0–0.4 |
| 2. Methacrylic Acid | 0 to 50% | Poor | Poor | Good | Excellent | 0.0–0.4 |
| 3. Ethyl Acrylate | 0 to 50% | Poor | Poor | Good | Excellent | 0.0–0.4 |
| 4. Vinyl Acetate | 0 to 50% | Poor | Poor | Good | Excellent | 0.0–0.4 |
| 5. High Vinyl Acetate Content > 50% | 0 to 50% | Poor | Poor | Good | Excellent | 0.0–0.4 |
| 6. Vinyl Alcohol | 0 to 50% | Poor | Poor | Good | Excellent | 0.0–0.4 |
| F. Polyethylene Ionomer | 0 to 50% | Poor | Good to Excellent | Poor | Fair | 0.2–0.1 |
| III. POLYBUTYLENE | | | | | | |
| A. Polybutene 1 | 0 to 100% | Poor | Good to Excellent | Poor | Fair | 0.3–0.1 |
| B. Poly(1 Butene/Ethylene) Copolymers | 0 to 100% | Poor | Good to Excellent | Poor | Fair | 0.3–0.1 |
| IV. ELASTOMERIC TPE's | | | | | | |
| A. Thermoplastic Vulcanizate (EDPM or NBR) | 0 to 100% | Poor | Fair to Good | Poor | Good | 0.1–0.1 |
| B. Melt Processable Rubbers (e.g., Plasticized Chlorinated-Polyolefin-EVA-Acrylate Blend) | 0 to 100% | Poor | Fair to Good | Poor | Good | 0.1–0.1 |
| C. Olefinic TPE's | | | | | | |
| 1. Reactor Produced | 0 to 100% | Poor | Good to Excellent | Fair | Excellent | 0.2–0.2 |
| 2. EDPM or EPR Propylene Blends | 0 to 100% | Poor | Good to Excellent | Fair | Excellent | 0.2–0.2 |
| D. Styrenic TPE's | | | | | | |
| Styrenic Block Copolymers with Elastomeric Mid Segments, e.g., | | | | | | |
| 1. Polybutadiene | 0 to 50% | Poor | Good | Poor | Good | 0.2–0.1 |
| 2. Polyisoprene | 0 to 100% | Poor | Good | Poor | Fair | 0.1–0.1 |
| 3. Ethylene Butylene | 0 to 50% | Poor | Good | Poor | Good | 0.1–0.1 |
| 4. Ethylene Propylene Rubber | 0 to 100% | Poor | Good | Poor | Good | 0.1–0.1 |
| E. Polyurethane Elastomers | | | | | | |
| 1. Esters | 0 to 50% | Poor | Good | Poor | Good | 0.1–0.1 |
| 2. Ethers | 0 to 50% | Poor | Good | Poor | Good | 0.1–0.1 |
| 3. Blends with Polyolefins | 0 to 50% | Fair | Good | Poor | Good | 0.1–0.1 |

*Polypropylene

From the foregoing description, one of ordinary skill in the art can easily ascertain the essential characteristics of the instant invention, and without departing from the spirit and scope thereof, can make various changes and/or modifications of the disclosed techniques to adapt them to various usages and conditions. As such, these changes and/or modifications are properly within the range of equivalents of the following claims.

What is claimed is:

1. A carpet including at least a tufted primary backing, said tufted primary backing having primary backing and tufts of carpet fibers penetrating a bottom surface of the primary backing and protruding from a top surface of the primary backing; a secondary backing; and an extruded sheet between a bottom surface of said tufted primary backing and an upper surface of said secondary backing, said extruded sheet being integrally fused to said tufted primary backing, and said primary backing, secondary backing and extruded sheet comprising an isotactic polyolefin polymer.

2. The carpet as claimed in claim 1, wherein said isotactic polyolefin polymer in each of said primary backing, secondary backing and extruded sheet is an isotactic polypropylene polymer.

3. The carpet as claimed in claim 2, wherein said isotactic polypropylene polymer is a homopolymer; random, impact or block copolymer; or terpolymer.

4. The carpet as claimed in claim 1, wherein said carpet fibers are integrally fused to said extruded sheet.

5. The carpet as claimed in claim 1, having a delamination strength of at least 2.5 lb./inch of width.

6. A recyclable carpet comprising a thermoplastic polyolefin tufted primary backing, said tufted primary backing having a primary backing and tufts of carpet fibers penetrating a bottom surface of the primary backing and protruding from a top surface of said primary backing; and a thermoplastic isotactic polyolefin polymer extruded sheet integrally fused to a bottom surface of the tufted primary backing at a temperature sufficiently high to melt both the tufted primary backing and extruded sheet such that a heat bond is formed between said extruded sheet and at least a portion of said tufted primary backing.

7. The recyclable carpet as claimed in claim 6, wherein said thermoplastic polyolefin polymer in each of said primary backing and said extruded sheet is an isotactic polymer.

8. The recyclable carpet as claimed in claim 6, wherein said extruded sheet is about 0.5 to about 20 mils thick.

9. The recyclable carpet as claimed in claim 7, further comprising a thermoplastic polyolefin polymer secondary backing integrally fused to said extruded sheet, wherein said extruded sheet is positioned between said primary backing and said secondary backing.

10. The recyclable carpet as claimed in claim 9, wherein said primary backing and extruded sheet comprises an isotactic polypropylene polymer.

11. The recyclable carpet as claimed in claim 10, wherein said secondary backing comprises an isotactic polymer.

12. The recyclable carpet as claimed in claim 7, further including a second layer integrally fused to a bottom surface of said extruded sheet, wherein said second layer comprises a thermoplastic elastomer.

13. The recyclable carpet as claimed in claim 6, wherein said carpet fibers are integrally fused to said extruded sheet.

14. The recyclable carpet as claimed in claim 8, wherein said extruded sheet is about 0.5 to about 15 mils thick.

15. The recyclable carpet as claimed in claim 8, wherein said extruded sheet is about 0.5 to about 7 mils thick.

16. The recyclable carpet as claimed in claim 6, wherein said temperature is at least 100° F. higher than the melting point of the thermoplastic polyolefin polymer extruded sheet.

17. The recyclable carpet as claimed in claim 6, wherein said temperature is at least 125° F. higher than the melting point of the thermoplastic polyolefin polymer extruded sheet.

18. The recyclable carpet as claimed in claim 6, wherein said temperature is at least 150° F. higher than the melting point of the thermoplastic polyolefin polymer extruded sheet.

19. A rollable recyclable carpet comprising a tufted primary backing, said tufted primary backing having a primary backing and tufts of carpet fibers penetrating a bottom surface of said primary backing and protruding from a top surface of said primary backing and an extruded sheet integrally fused to a bottom surface of the tufted primary backing at a temperature at or above the melting temperature of the primary backing, wherein both said primary backing and said extruded sheet comprise an isotactic polypropylene polymer.

20. The recyclable carpet as claimed in claim 19, wherein said tufts of carpet fibers protruding from a top surface of said primary backing comprise an isotactic polypropylene polymer.

21. The recyclable carpet as claimed in claim 20, further including a secondary backing comprising an isotactic polypropylene polymer.

22. The recyclable carpet material as claimed in claim 21, having a delamination strength of at least 2.5 lb./inch of width.

23. The recyclable carpet as claimed in claim 19, wherein said carpet fibers are integrally fused to said extruded sheet.

24. The recyclable carpet as claimed in claim 22, having a delamination strength of at least 6.0 lb./inch of width.

25. The recyclable carpet as claimed in claim 22, having a delamination strength of at least 6.0 lb./inch of width.

26. A recyclable carpet including at least a tufted primary backing, said tufted primary backing including a primary backing and tufts of carpet fibers penetrating a bottom surface of the primary backing and protruding from a top surface of the primary backing; a secondary backing; and an extruded sheet between and integrally fused to a bottom surface of said tufted primary backing and an upper surface of said secondary backing, said extruded sheet being integrally fused to said tufted primary backing at a temperature sufficiently high to melt each of the tufted primary backing, extruded sheet and secondary backing such that a heat bond is formed, wherein said primary backing, tufts, secondary backing and extruded sheet comprise an isotactic polypropylene polymer.

27. A rollable, recyclable carpet including at least a thermoplastic polyolefin polymer tufted primary backing, said tufted primary backing having a primary backing and tufts of thermoplastic polyolefin polymer carpet fibers penetrating a bottom surface of the primary backing and protruding from a top surface of the primary backing; and a thermoplastic isotactic polyolefin polymer extruded sheet integrally fused to a bottom surface of the tufted primary backing, said extruded sheet having a thickness of 0.5 to 15 mils and being extruded onto and integrally fused with the tufted primary backing at a temperature at or above the melting temperature of the primary backing, tufts and extruded sheet such that a heat bond is formed.

* * * * *